United States Patent
Compton et al.

(10) Patent No.: US 8,135,763 B1
(45) Date of Patent: Mar. 13, 2012

(54) APPARATUS AND METHOD FOR MAINTAINING A FILE SYSTEM INDEX

(75) Inventors: James T. Compton, Durham, NC (US); Surrendranath R. Doohkan, Franklin, MA (US); Stephen A. Fridella, Belmont, MA (US); Uday K. Gupta, Westford, MA (US); Nikolay Popov, Wayland, MA (US); Stephen A. Rago, Warren, NJ (US)

(73) Assignee: EMC Corporation, Hopkinton, MA (US)

( * ) Notice: Subject to any disclaimer, the term of this patent is extended or adjusted under 35 U.S.C. 154(b) by 123 days.

(21) Appl. No.: 11/241,054

(22) Filed: Sep. 30, 2005

(51) Int. Cl.
*G06F 17/30* (2006.01)

(52) U.S. Cl. ........................................ 707/822; 707/823

(58) Field of Classification Search .................. 707/100, 707/2, 822, 823; 714/6
See application file for complete search history.

(56) References Cited

U.S. PATENT DOCUMENTS

| | | | |
|---|---|---|---|
| 5,848,410 A * | 12/1998 | Walls et al. | 1/1 |
| 6,704,838 B2 * | 3/2004 | Anderson | 711/114 |
| 6,820,121 B1 * | 11/2004 | Callis et al. | 709/225 |
| 2004/0193945 A1 * | 9/2004 | Eguchi et al. | 714/6 |
| 2004/0267700 A1 * | 12/2004 | Dumais et al. | 707/2 |
| 2005/0195660 A1 * | 9/2005 | Kavuri et al. | 365/189.05 |
| 2006/0004787 A1 * | 1/2006 | Borthakur et al. | 707/100 |
| 2007/0016618 A1 * | 1/2007 | Robert et al. | 707/200 |

* cited by examiner

*Primary Examiner* — Charles Rones
*Assistant Examiner* — Fariborz Khoshnoodi

(57) ABSTRACT

An improved policy enforcement architecture includes several components that improve the performance of policy enforcement in a hierarchical storage environment. A File System Query instruction permits a richer set of queries to be expressed by a policy engine, thereby permitting more complex policies to be implemented with ease. The File System result is generated at the file server, and only files of interest are forwarded to the policy engine. The file system query advantageously may be applied against a pre-generated index having one more characterizing attributes to further reduce the processing required to retrieve policy data. An Index Build instruction, added to a programming interface, allows a policy engine generate the characterizing indices in advance of use. Index maintenance techniques maintain consistency between the index and the file system to ensure that the policy can be enforced using accurate file information.

16 Claims, 13 Drawing Sheets

Synchronous Index Maintenance

APPARATUS AND METHOD FOR MAINTAINING A FILE SYSTEM INDEX

FIELD OF THE INVENTION

This invention relates generally to the field of file systems and more specifically to an architecture for improved file system policy enforcement.

BACKGROUND OF THE INVENTION

In any storage system design it is important to intelligently and cost-effectively manage data and meta-data. A cost-effective storage system includes both high and low cost storage devices. An intelligent file transfer policy moves file data between storage devices in the system to relocate infrequently accessed data from feature rich, expensive, highly protected and high-speed disk storage to more economical and possibly slower mass storage in accordance with business goals.

Tiered storage solutions often include a hierarchy of file servers with attached storage of varying cost and capability. The exemplary tiered storage solution of FIG. 1 includes a hierarchy 10 of file servers which serve files and applications to the other clients 12 or other file servers on the network. The hierarchy of Network Attached Server (NAS) includes a primary NAS file server 14 and a secondary NAS file server 16. Each NAS connects directly to a network using TCP/IP over Ethernet. Files are transferred between NAS file servers using any NAS protocol, such as Common Internet File Sharing (CIFS), Network File System (NFS), File Transfer Protocol (FTP) or the like. The storage hierarchy may also include storage for archived data, such as a Content Addressed Storage (CAS) server 20. A Policy Engine (PE) 18 controls the transfer of files between primary NAS 14, secondary NAS 16 and CAS 20.

The PE is a server that retrieves file system meta-data from the primary NAS via various attribute access interfaces including but not restricted to the File Mover Application Interface (API), described in U.S. patent Ser. No. 11/085,898, filed Mar. 21, 2005 and entitled "Selection of Migration Methods Including Partial Read Restore in Distributed Storage Management" by Amegadzie et al, and incorporated herein by reference. The file system meta-data includes a variety of attributes associated with the files in the file system. The Policy Engine (PE) analyzes the value of these attributes in view of policy rules that direct the placement of files at appropriate tiers of the storage hierarchy. Using the File Mover API, the PE issues commands to move data off-line to secondary storage.

An accurate enforcement of a file migration policy can only be performed if the attribute values available to the PE for each file are kept current. File attribute scanning is typically performed prior to policy enforcement to obtain current attribute values. During the scan, each attribute for each file in the file system is read and its value subsequently evaluated with regard to the criteria associated with the policy. File system scanning includes but is not restricted to reading directory contents, looking up file names, and querying the value of file attributes for every file in the NAS server. File attribute values are obtained using multiple NAS operations, and returned to the PE using multiple protocols. The PE then evaluates the retrieved attribute values and other policy related information (such as pathnames, file name extensions, and other available meta-data) to identify files of interest.

The file system scanning method is inefficient in terms of network latency, consumption of network bandwidth and CPU utilization. Thus policy enforcement applications are generally performed during off-peak hours, when client utilization of the storage devices is low. However, as the capabilities and number of files served by the NAS continue to grow, the processing of files for policy enforcement purposes adversely impacts a client's access to the resources. Accordingly, it would be desirable to identify a method and apparatus that would improve the performance of file processing for policy enforcement.

SUMMARY OF THE INVENTION

According to one aspect of the invention, a method of maintaining an index to files in a file system is provided. The index includes identifiers of files having at one or more key attribute values of interest, and the method including the steps of monitoring file system events to detect change to the one or more key attribute values, and updating the index in accordance with the one or more key attribute value changes. According to another aspect of the invention, an apparatus is provided for maintaining an index to files in a file system of a file server. The index includes identifiers of files having one or more key attribute value of interest. The apparatus includes file system monitoring means for monitoring file system events to detect changes in key attribute values associated with files and index update means for updating the index in accordance with detected changes in the key attribute values. With such an arrangement, currency and consistency of file statistics is maintained.

DETAILED DESCRIPTION

As will be described below, the present invention is directed at an architecture that may be used to improve system performance during file system policy enforcement. The architecture includes a file system query component and an index component. The components of the system may be used alone or in combination in the present invention. Each will be described below.

Index Component

Figure 1:
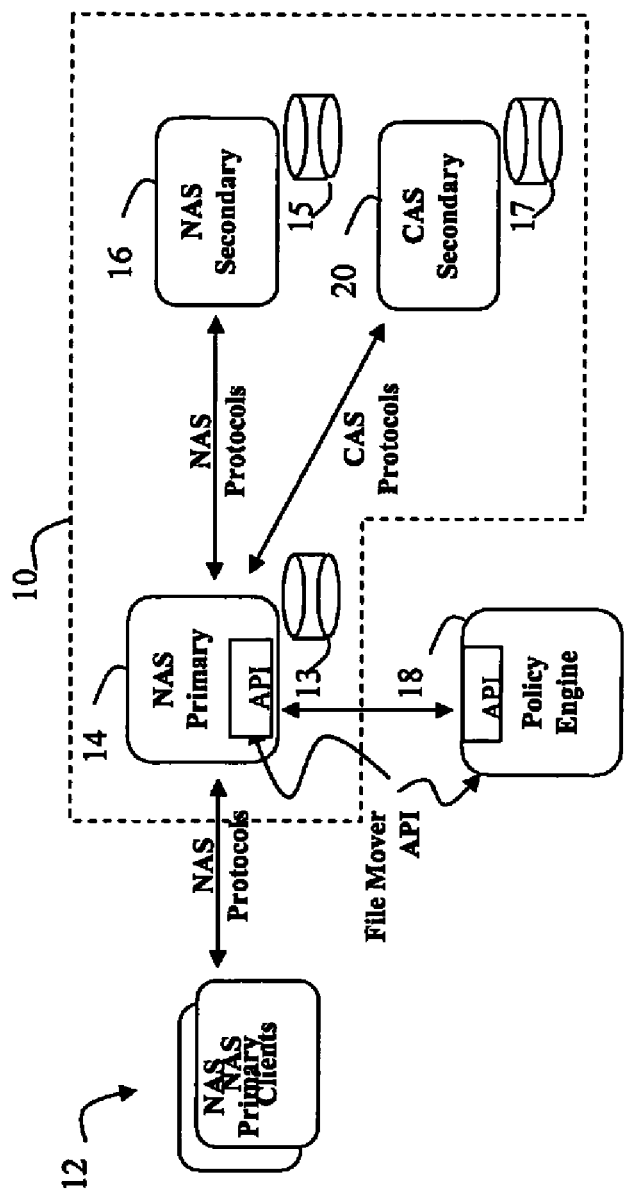
FIG. 1 illustrates an exemplary tiered storage solution.
Figure 2:
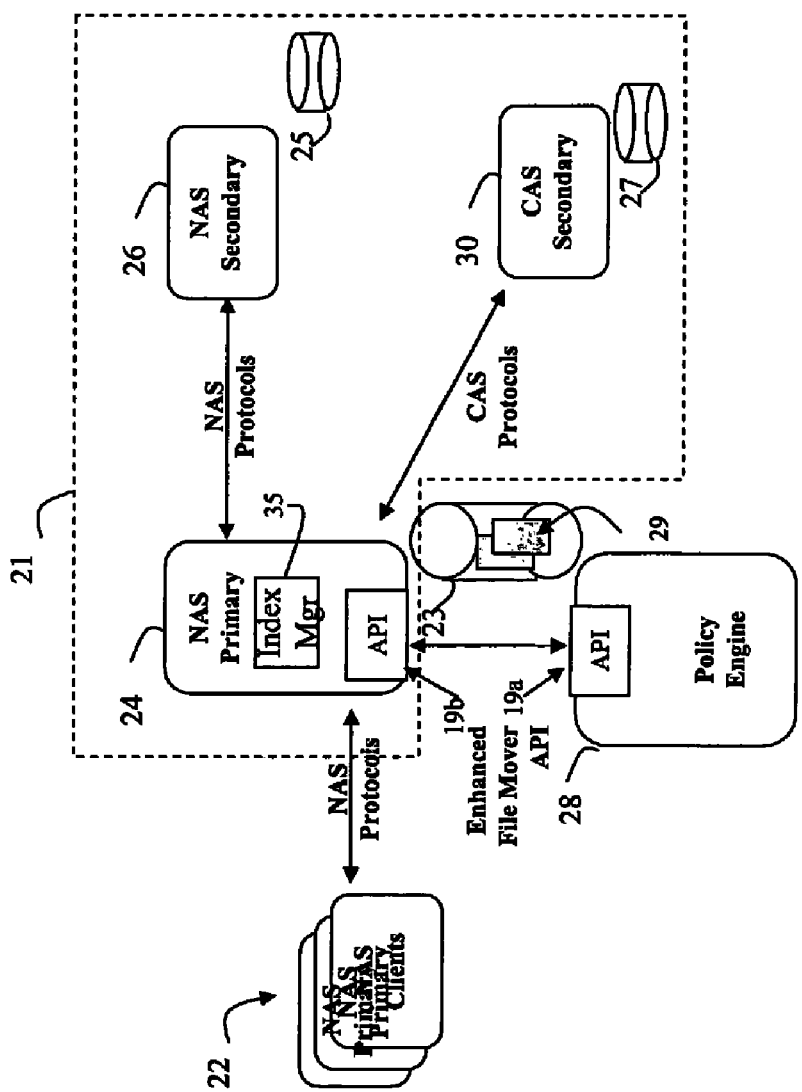
FIG. 2 illustrates a tiered storage solution having an enhanced Application Programming Interface (API) and including index management functionality for enabling filtering of file system meta-data before delivery to a policy engine.

Referring now to FIG. 2, an exemplary architecture of the present invention includes a primary file server 24 coupled to a variety of secondary storage servers including Network Addressed Storage (NAS) secondary storage 26 and Content Addressed Storage (CAS) secondary 30. Although NAS and CAS secondary storage is shown, it should be understood that the present invention is not limited to use with any particular type of storage devices.

The NAS primary 24 communicates with a Policy Engine 28 via an Enhanced File Mover Application Programming Interface (API) 19a and 19b. The Policy Engine 28 migrates file data from the primary storage 29 to secondary storage 32, 26 and 30 according to a defined migration policy. Although the Policy Engine 28 is shown as a distinct server, it may be that the functionality of the PC is incorporated in a NAS client, the NAS server, or other device, and thus the present invention is not limited to the illustrated implementation.

According to one aspect of the invention, one or more indices such as index 29 are generated, stored and maintained by Index Manager 35. Each index represents a filtered subset of the files in the file system ordered by values of a particular key file attribute such as file size or modification time. Filtering is performed based on a set of one or more file system attribute values. The NAS Server builds indices using attributes, as requested by the PE, that are associated with the policy, to characterize files for improved policy enforcement performance.

Figure 3:
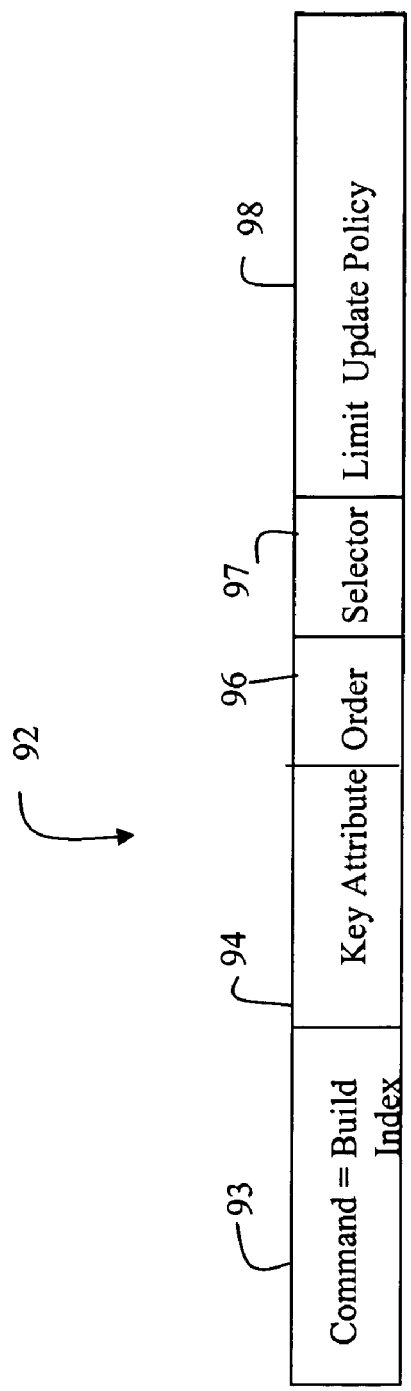
FIG. 3 illustrates exemplary fields that may be included in an Index Build instruction of the enhanced API of the present invention.

Each index is built in response to an Index Build instruction received at the API 19b. FIG. 3 illustrates several exemplary fields that may be included in an index build instruction 92. In general each index build instruction includes the following fields: an index identifier field 94, a Key attribute field 94, which is the name of the file attribute used for indexing, an ordering field 96 to indicate if the index is increasing or decreasing, a selector field 97, which is a complex query identifying the subset of files which are included in the index, a Limit field 98, specifying a limit on the maximum number of files to include in the index (this is optional), and an update policy field, indicating whether the index is to be maintained synchronously, asynchronously or at a point-in-time. The particular maintenance embodiments are described in more detail later herein.

Accordingly, appropriate population of the fields of the Index Build request can provide an index based on a modification time attribute/increasing order/limit 1000. The resulting index would be an index of the least recently modified 1000 files.

An Index Build request also may request an index of file size/decreasing order/file selector: "*.doc". The resulting index would be an index of all ".doc" files ordered by file size. In addition, as is described in more detail below, the index build request may request an index of files sharing multiple different attribute values; such indices also being referred to as complex indices. An exemplary complex index may identify files having a name attribute=*.doc, and a size attribute of >10 MB, and a time-last-modified attribute of>10/5/2004, all ordered in decreasing order of file size.

Figure 4:
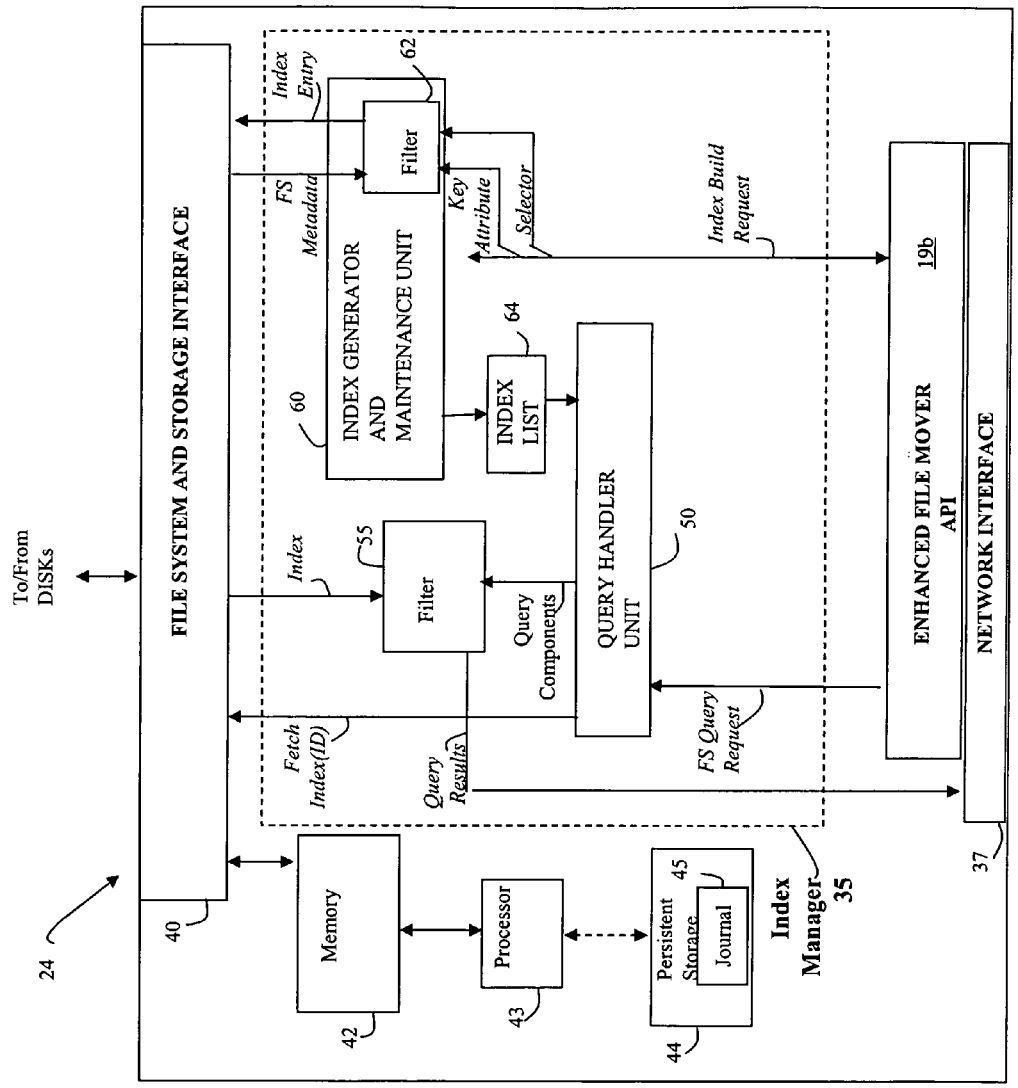
FIG. 4 is a block diagram illustrating several components that may advantageously be included in a file server implementing the present invention.

Referring now to FIG. 4, several exemplary components that may be included in a file server 24 to implement various aspects of the invention will now be described. It should be understood that the exemplary components are representative of functionality that may be implemented in hardware, software, or any combination thereof. In addition, other embodiments of the invention where the functionality is differently delineated but equivalent are included within the scope of the present invention.

The file server 24 is shown to include a network interface 37 and a file system and storage interface 40. The network interface is not limited to any particular network hardware, but may include any interface executing any of a variety of network protocols such as Common Internet File Server (CIFS), Network File System (NFS), Hyper-Text Transport Protocol (HTTP), File Transfer Protocol or other protocol. Similarly, the storage interface is not limited to any particular hardware, but may include any interface executing any of a variety of disk access protocols such as Fibre Channel, SCSI, or ISCSI. Other typical file server components include a memory 42, processor 43 and persistent storage device 44, which may be internal to the file server (such as a Non-Volatile Random Access Memory (NVRAM) or EEPROM) or may be external to the file server (such as an attached disk). Persistent storage is used to store information that should be retained in the event of a failure of the file server. The persistent information may include a journal 45 which assists in maintaining consistency of the file system as will be described in more detail below.

The file server of the present invention also includes an index manager 35. The index manager includes query handler logic including a Query Handler Unit 50 and a Filter 55. The query handler logic is described in more detail below.

The index manager also includes an index Generator and Maintenance Unit (GMU) 60 including filter 62 and Index List 64. As shown in FIG. 4, the index GMU is coupled to receive an Index Build request from the API 19b. Certain information from the Index Build request, including the Key attribute and Selector fields, are forwarded to the Filter. The filter is also coupled to receive file system meta-data from the file system 40. The filter scans a file system for files having attributes with values that match the selector field criteria, creating an index of identifiers to such selected files ordered on the value of the indicated key attribute. As files are identified, the index is built. In one embodiment, each generated index is stored in the file system for ease of maintenance and to take advantage of consistency functionality generally provided for file system contents. Thus FIG. 4 illustrates an index entry connection between the filter 62 and the storage interface. An index list 64 may advantageously be maintained to identify available indices for later use.

Figure 5:
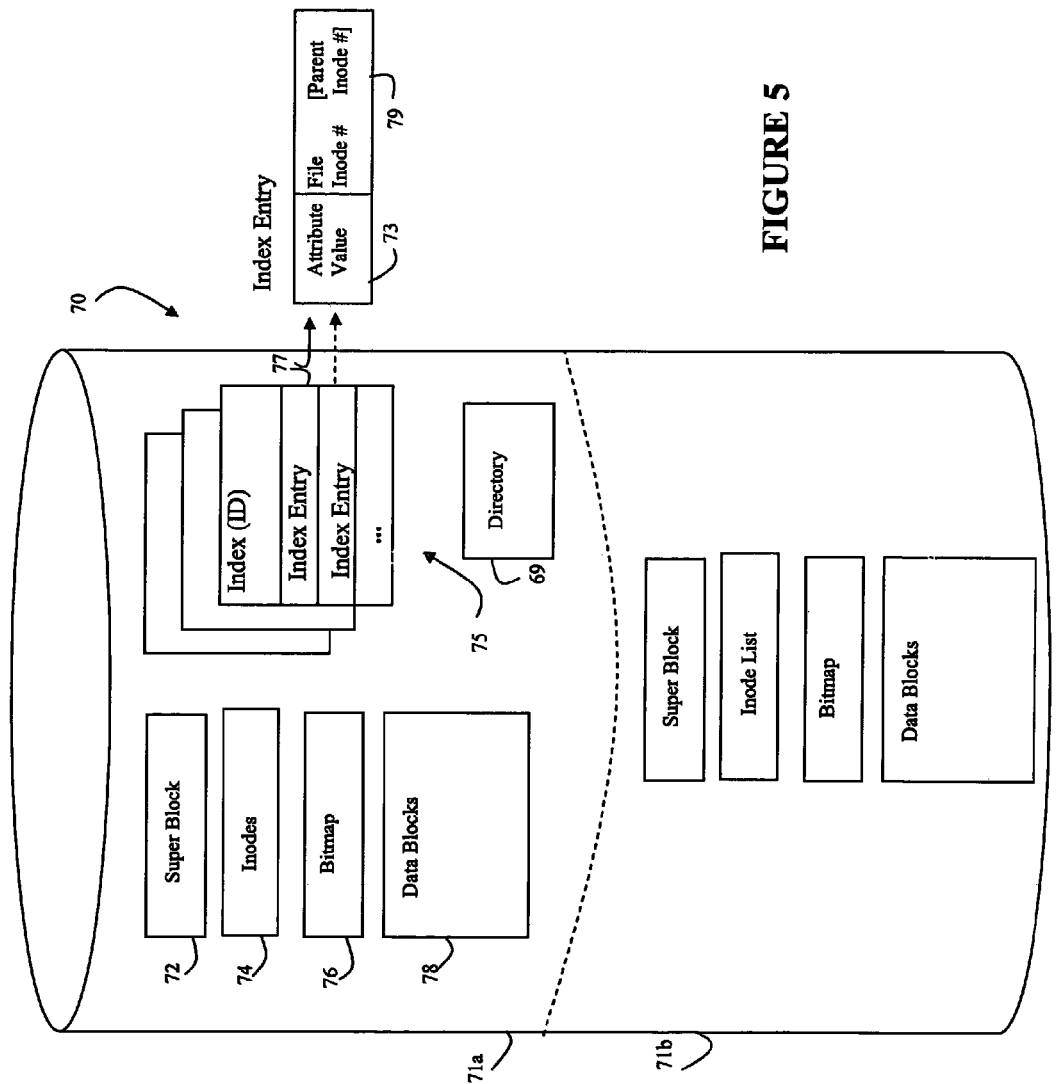
FIG. 5 is a diagram provided to illustrate the storage of index information in the file system.

Referring briefly to FIG. 5, an exemplary file system is shown to be comprised of a set of cylinder groups 71a, 71b. Each cylinder group has a redundant copy of the super block 72, a group of inodes 74 and a bit map 76 describing available blocks in the cylinder group. Each inode in the group of inodes 74 is a data structure which identifies files in a file system. There is an inode for each file and a file is uniquely identified by the file system on which it resides and its inode number on that system. Each inode contains meta-data associated with the file and a list of links to one or more of the data blocks 78 that comprise the file. The file meta-data may include, but is not restricted to, locking information, mode and type of file, the number of links to the file, the owner's user and group ids, the number of bytes in the file, access and modification times, the time the inode itself was last modified and the addresses of the file's blocks on disk. In particular, the file meta-data includes migration status for the file, i.e. whether the file is "offline" or "online." As will be appreciated from the description below, the index may be built using any file attribute value, whether explicitly described herein, otherwise known, or later developed, either alone or in combination, and the invention is not limited to those attributes described by way of example herein.

According to one aspect of the invention, one or more indices 75 are stored in a special file in the file system. As mentioned above, each index includes one or more index entries 77 identifying a file which meets the selection criteria for that index. An exploded view of an index entry 77 is shown in FIG. 5 to include an attribute value field 73 (specifying the value of the key attribute, for example a file size value), an inode number field 79, including the inode of the file associated with the attribute and the Inode number of the parent directory of the file. In one embodiment, the index is stored as a Binary tree (Btree) structure, although the manner of storing the index is not a limitation of the present invention.

Figure 6:
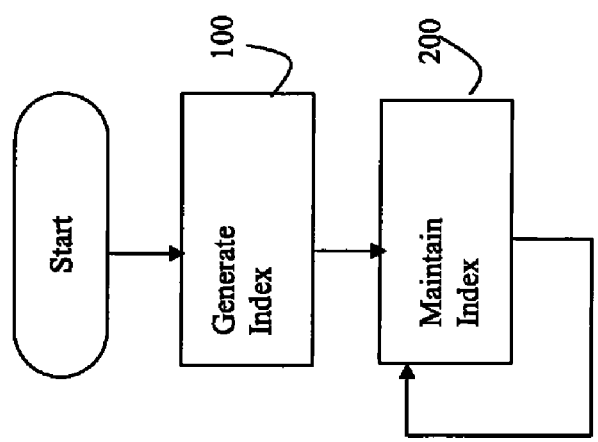
FIG. 6 is a flow diagram provided to illustrate components of index management.

Referring now to FIG. 6, the basic components of index support include an index build process 100 and an index maintenance process 200. The index build process will be performed at any point during operation when a Build Index operation is requested through the API. In order to ensure that the index is consistent with the file system contents, a full file-system scan is performed during the initial index build. The file system scan is performed one time for each index; thereafter, the index is maintained using any one of a variety of maintenance techniques, including synchronous maintenance, asynchronous maintenance, and point-in-time maintenance. To improve performance, multiple build index requests may be pooled to allow building of multiple indices with a single file system scan.

Figure 7:
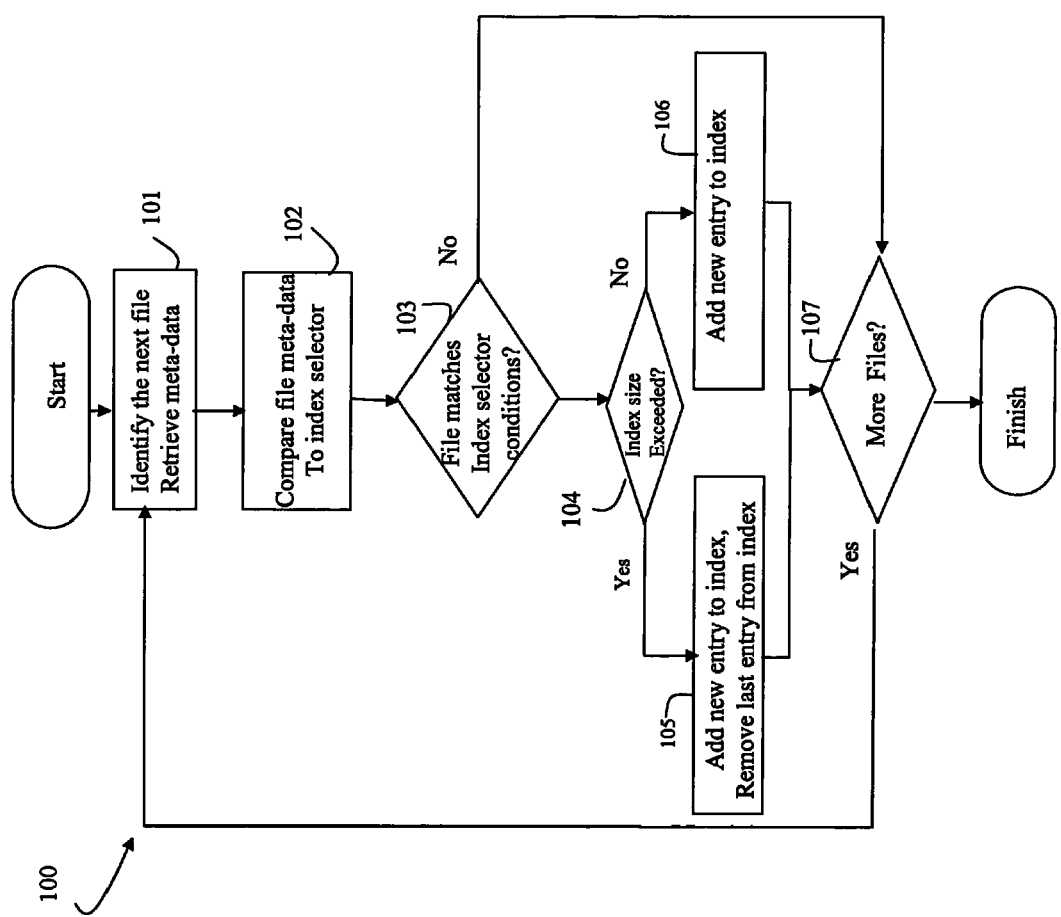
FIG. 7 is a flow diagram illustrating exemplary steps that may be taken to generate an index in response to the Index Build instruction.

Referring now to FIG. 7, exemplary steps of the build index process 100 will now be described. At step 101, the meta-data from the first file of the file system is retrieved. In step 102, the meta-data of the file is compared against the selector for the index being built. If at step 102 it is determined that the file meets the conditions expressed in the index selector, then at step 103 an index entry including a file inode number and the value of the indexed attribute generated for storage in an index entry. At step 104 it is determined whether the index limit has been reached. If it is determined at step 104 that the index limit has been reached, then at step 105 the index entry generated at step 103 is added to the index, and an appropriate entry in the index, based on the order specification, is removed. Otherwise, at step 106 the index entry is added to the index. In this way the size of the index remains within the prescribed limit. The process proceeds to step 107, where it is determined whether there are more files to process. The scan of the file system continues until all file meta-data has been processed.

Once the index has been populated, index identifiers, including the key attribute and the selector associated with the index, as well as a pointer to the file storing the index, are stored in the index list 64 (FIG. 4).

Example indexes that may be built in such a manner include an index of all files ordered by increasing value of modification time, an index of 1000 files ordered on decreasing size (the 1000 largest files are stored in the index), and an index of all files of size>10 MB ordered by increasing value of modification time.

Once the index is built, it is advantageously moved to the file system. Maintaining the index in the file system affords to the index the file system's levels of protection and maintenance.

Index Maintenance

The initial index stored in the file system captures the state of the files in the file system at a specific point in time. While such a snapshot may be helpful to the policy engine, it is desirable that the index remain current with changes occurring in the file system. Accordingly, the index maintenance component 200 of the present invention maintains the relevancy of the index. Different methods may be used to maintain index/file system consistency, including synchronous index maintenance 200-A (FIG. 8), asynchronous index maintenance 200-B (FIG. 9) and point in time index capture 200-C (FIG. 10).

Figure 8:
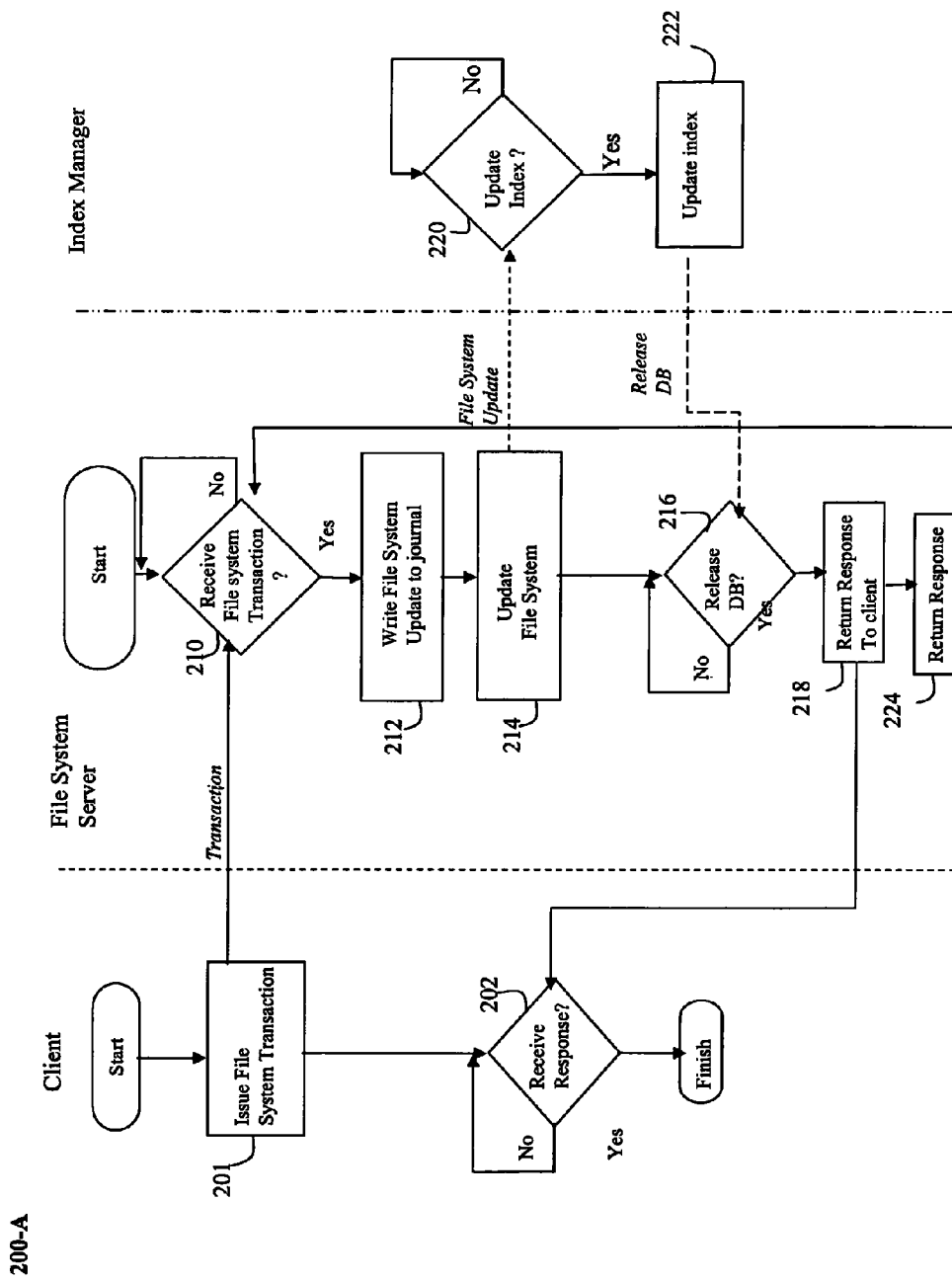
FIG. 8 is a flow diagram illustrating exemplary steps that may be taken to synchronously maintain the index built in the process of FIG. 7.

FIG. 8 is a combination flow diagram/data flow diagram provided to illustrate various actions that are performed in a synchronous index maintenance process 200-A. Any request by a client or other device on a selected file is delivered to the file server at step 201. At step 210 the filer sever determines whether the request will result in a meta-data update. If so, at step 212 the file server uses a journaling technique to ensure that the file system remains consistent in the case of a fault. The journaling technique includes the step of logging a file system event in a journal stored in persistent storage (such as an NVRAM, or an attached disk) prior to performing the actual modification of the file system. Once it can be verified that the file system event has successfully been completed, it can be removed from the log, or 'released'. In the event that a fault occurs during the modification of the file system, the journal can be replayed to identify and capture lost file system state.

According to one aspect of the invention, the indices are also stored in the file system. When updating an index file, transactional behavior is required to ensure that indexes are not partially updated in the presence of faults. One way to provide such behavior is to record all index updates in a redo-transaction log on persistent storage before updating the index file. Once the index file is successfully updated, the log entry for the transaction can be released. If a crash occurs between the time the transaction is written to the log and the time that the index file is updated, the log can be replayed at recovery time to ensure that the transaction is properly applied. Note that the redo-transaction log for index transactions is similar to, but separate from, the file-system meta-data transaction log. It should be understood that any method of ensuring transactional updates to the index may be substituted herein.

In the synchronous file system maintenance process of the present invention, after the file server writes the transaction to the log at step 212 and modifies the file system entry at step 214, but prior to releasing the log entry, the file server forwards the attribute update to the index manager 220. At step 220, the index manager determines whether the attribute modified by the file system event should change the contents of any of the indices. If so, at step 222 the index manager updates the index file with the inode # and attribute value, and returns control to the file server.

At step 216, control is returned to the file server, and at step 218 it returns the response to the client. After a short interval, the file system modification is flushed to persistent storage, and the file server releases the file system event from the journal at step 224. Logging the file system transaction before the index update, as shown in FIG. 8, prevents the problem of having an updated index that does not reflect the contents of the file system.

The synchronous index maintenance process provides the tightest consistency between file system state and index at the cost of possibly increasing latency of file system operations, because the index update is incorporated with the file system transaction. However, such a process ensures that any change to the index will be consistent with any change to the file system. For example, in a system which maintains file system consistency through journaling the file system transaction will be entered in the journal before the index is updated. A fault that occurs at any point in the index update process will cause the replay of uncompleted transactions in the journal thereby ensuring that the index is eventually updated.

Figure 9:
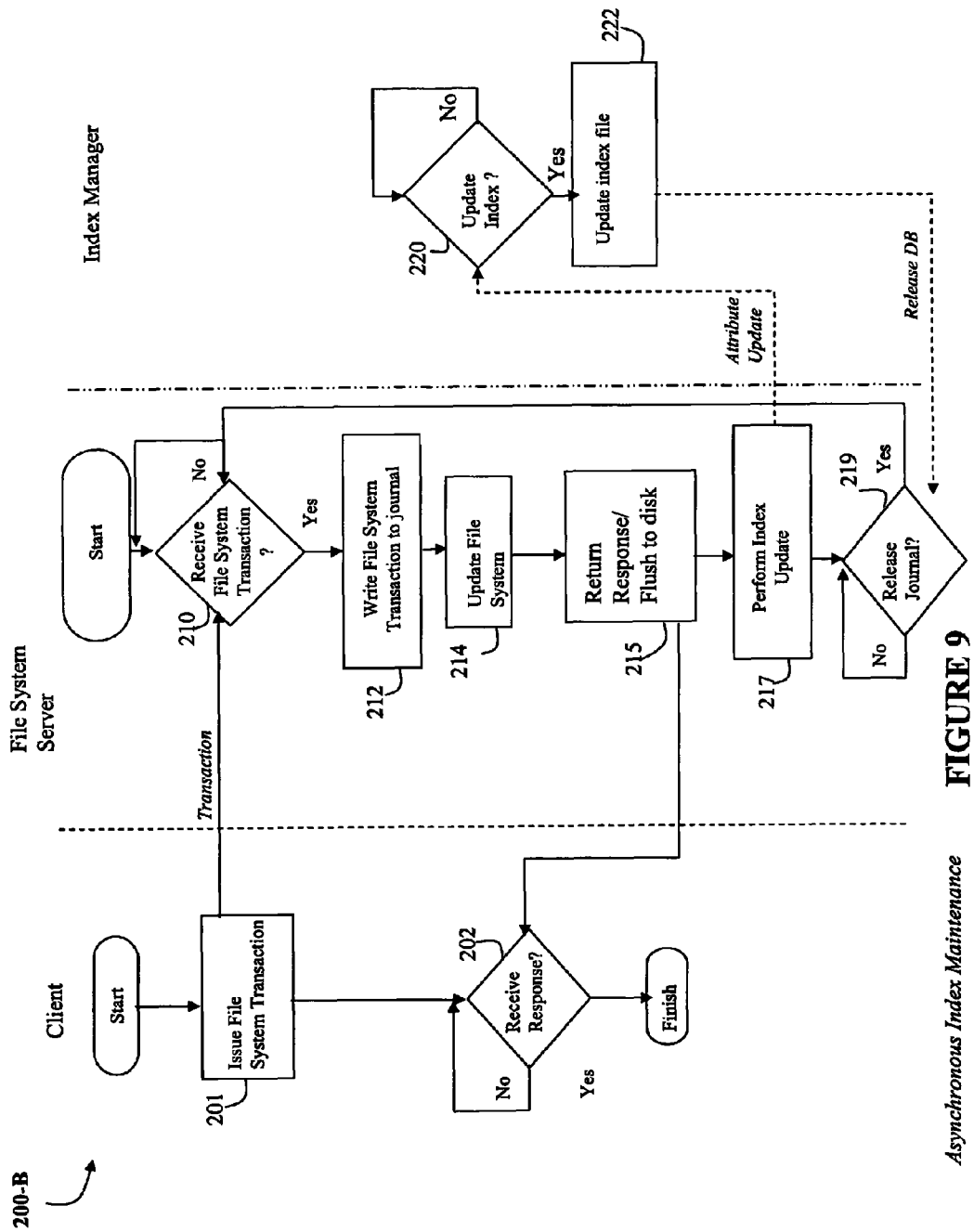
FIG. 9 is a flow diagram illustrating exemplary steps that may be taken to asynchronously maintain the index built in the process of FIG. 7.
Figure 10:
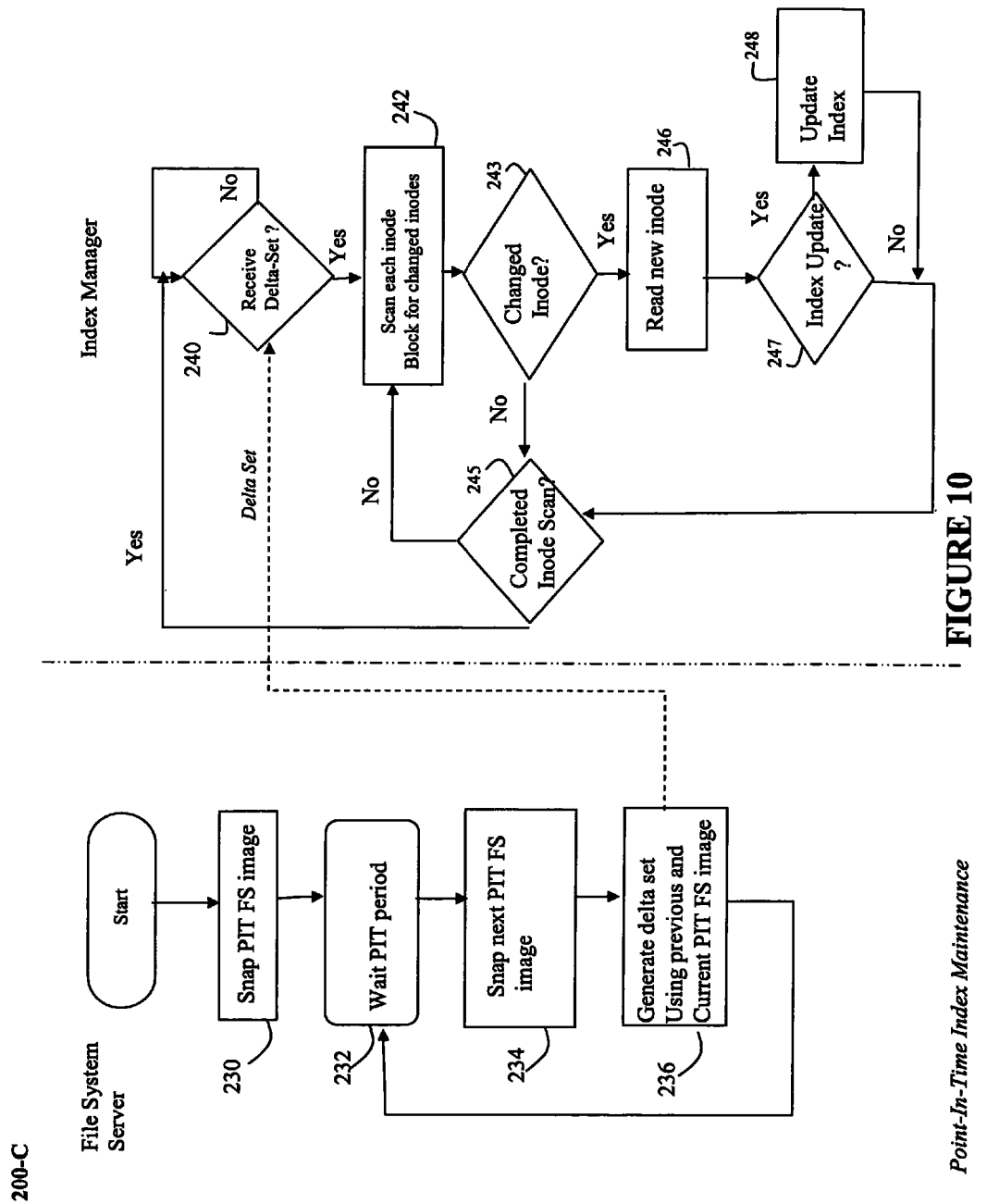
FIG. 10 is a flow diagram illustrating exemplary steps that may be taken to maintain the index built in the process of FIG. 7 using a Point In Time process.

FIG. 9 illustrates several steps of the Asynchronous Index Maintenance process 200-B. The main difference between the Synchronous Index Maintenance process 200-A of FIG. 9 and the Asynchronous Index Maintenance process 200-B is the timing at which modified data is returned to a client. With the asynchronous index maintenance, file system operations which update file attributes do not immediately result in updates to the indexes. These operations return to the client without updating the index, and the index is updated asynchronously.

At step 210, a file attribute update request is delivered to the file-system. At step 212, the file update event is written in the journal, and at step 214 the file system transaction is performed. At step 215, the response is returned to the client and the updated meta-data is flushed to disk.

After the updated meta-data is flushed to disk, but before the transaction is released from the log, at step 217 the transaction is forwarded to the Index manager to perform the index update. As above, the index manager examines the file system transaction to determine if the transaction affects any of the built indices, and if so updates the associated index. Once the index update is completed, the transaction log entry is released.

In Asynchronous updates, a small window of inconsistency is allowed between the index and file system state, but the process reduces latency of file system operations over the synchronous method described above. This log-based approach provides a natural flow-control mechanism, since as the log fills up, file system operations will be blocked.

FIG. 10 illustrates several steps of the Point-In-Time (PIT) Maintenance process 200-C. PIT maintenance involves periodically scanning file system snapshots to identify files with changed meta-data. The identified files having changed meta-data are then processed to update any indices affected by the changed meta-data.

Thus at step 230, the file server obtains a snapshot of the file system meta-data. After waiting a period of time, at step 234 a next snapshot of the file system meta-data is obtained. The period of time that is selected is a matter of design, but is generally selected to be small enough that not all of the meta-data changes during the period, while being large enough so that the index update process does not continually execute.

At step 236 a delta set, differentiating the two snapshots, is generated. The delta set is a bit-map of blocks which have changed between the previous point in time image and the latest point-in-time image. The delta-set can be calculated efficiently with well-known techniques.

At step 240, the index manager receives the delta set. Using knowledge of the physical file system layout, at step 242 the index manager starts scanning each inode block for changes to inodes in the block.

If it is determined at step 243 that there is a changed inode, then at step 246 the meta-data for the changed inode is read to identify the changed attribute, and at step 247 it is determined whether the changed attribute affects any of the indices. If it does, then at step 248 the index is updated.

One advantage of the Point-In-Time process is that scanning with the aid of a delta-set permits efficient location of only the changed inodes, thereby increasing efficiency in the update the index based on those changes. The Point-in-time update approach allows the cost of updating the index to be confined within a window of the administrator's choosing. One drawback of the Point-In-Time process is that the window of time in which the index does not precisely reflect the current state of the file system is generally larger than for the asynchronous update method.

Accordingly, a system and method of generating and managing indices has been shown and described. The indices may advantageously be used to increase policy enforcement performance by decreasing the processing overhead incurred when handling File System Queries of the present architecture. However, as will become apparent with the below description, pre-generated indices, although advantageous, are not a requirement in a file system supporting File System Queries of the present invention.

File System Query

According to one aspect of the invention, a File System Query instruction is added to the Application Programming Interface (API) coupling the Policy Engine with the primary server. The File System Query allows the PE to express a richer set of queries, thereby permitting more complex policies to be implemented with ease. The set of queries extends the usage attributes typically available to a policy engine, allowing the policy engine to more accurately identify files of interest. File attributes related to multiple file system access protocols can be queried in a single call, thereby eliminating the need for scanning by way of multiple protocols methods individually. The file system query allows the policy engine to limit the amount of data that is returned during policy management to only data of interest. As mentioned above, the file system query advantageously may be applied against a pre-generated attribute index to further reduce the processing required to retrieve policy data, although this is not a requirement of the invention.

Figure 11:
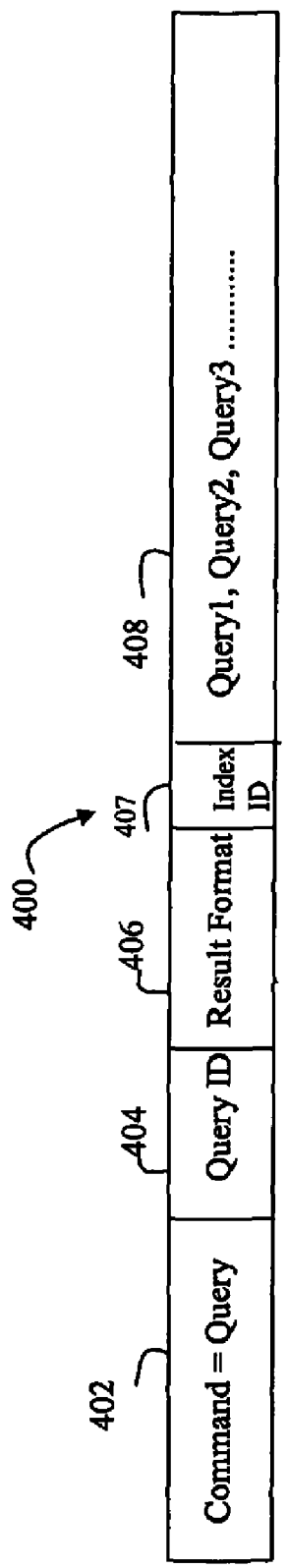
FIG. 11 is a diagram provided to illustrate exemplary fields of a File System Query instruction which may be included in the enhanced API of the present invention.

FIG. 11 illustrates several fields that may be included in a file system query instruction. The File System Query 400 includes a command field 402 encoded to indicate a File System Query, a query identifier 404 for use in matching query results to the query request, a result format field 406, for indicating whether the results should be returned as a full path name or a file ID, an index identifier 407, which indicates the index that should be considered when responding to the query, and a selector field 408. The index identifier 407 may contain the special values 0, indicating that no index should be used when responding to the query, or −1, indicating that any applicable index can be used when responding to the query. The selector field 408 includes one or more query components, each query component specifies a condition that a file must meet to be included in the result list. As described later, each query component can request attribute value matching and comparisons as well as file pathname matches.

The File System Query allows the Policy Engine to directly query for files with attributes matching certain criteria, such criteria being expressible as selector field queries. Basic queries can be comparison operations on file attributes which include those defined for CIFS and NFS network file services but may include other attributes as may be beneficial for a file server to maintain. Comparisons include such operators as "equals", "less than", "greater than", and "not equal". Ordering is assumed to be lexicographic for text attributes and numeric for numeric attributes. Examples of basic queries include a query for a file size greater than 10 MB, files having a modification time less than Jan. 1, 2005 and files with an offline flag equals 1. As mentioned above, the selector field of the File System Query may include multiple query components. A query that includes one or more query components is referred to herein as a complex query. A complex query is a set of basic queries. Attributes from different protocol types, including NFS, CIFS, HTTP and FTP can be queried within a single request. A file is considered to match the complex query if and only if it matches all the basic queries comprising the complex query. Note that it is not a limitation of the invention that the queries be purely conjunctive (AND), various other approaches will be obvious to those learned in the art. Examples of complex queries include A query which selects files having a size greater than 10 MB and offline flag equals 1, A query which selects files having a modification time less than Jan. 1, 2005 and worm state equal "commit", A query which selects files having a modification time greater than Jan. 1, 2005 and worm state not equal "commit" and size>5 MB A query which selects files having a modification time greater than Jan. 1, 2005 and size>1000 MB A query which selects files having a modification time less than Jun. 1, 2005 and worm state equal "commit"

By maintaining extended statistical usage attributes for files, the file server allows the PE to express a richer set of queries. Examples of extended statistical usage attributes include an access frequency attribute which tracks the number of accesses to a file within a certain time delta (last day, month etc.), and an index access frequency array which tracks the number of accesses to a file within a certain time delta, for the previous X time deltas (i.e. the number of accesses per day for the last X days). These attributes provide a more accurate measurement of "hot" files than mod time or access time alone. Other interesting statistical measurements of a file's usage and file popularity can be provided.

Figure 12:
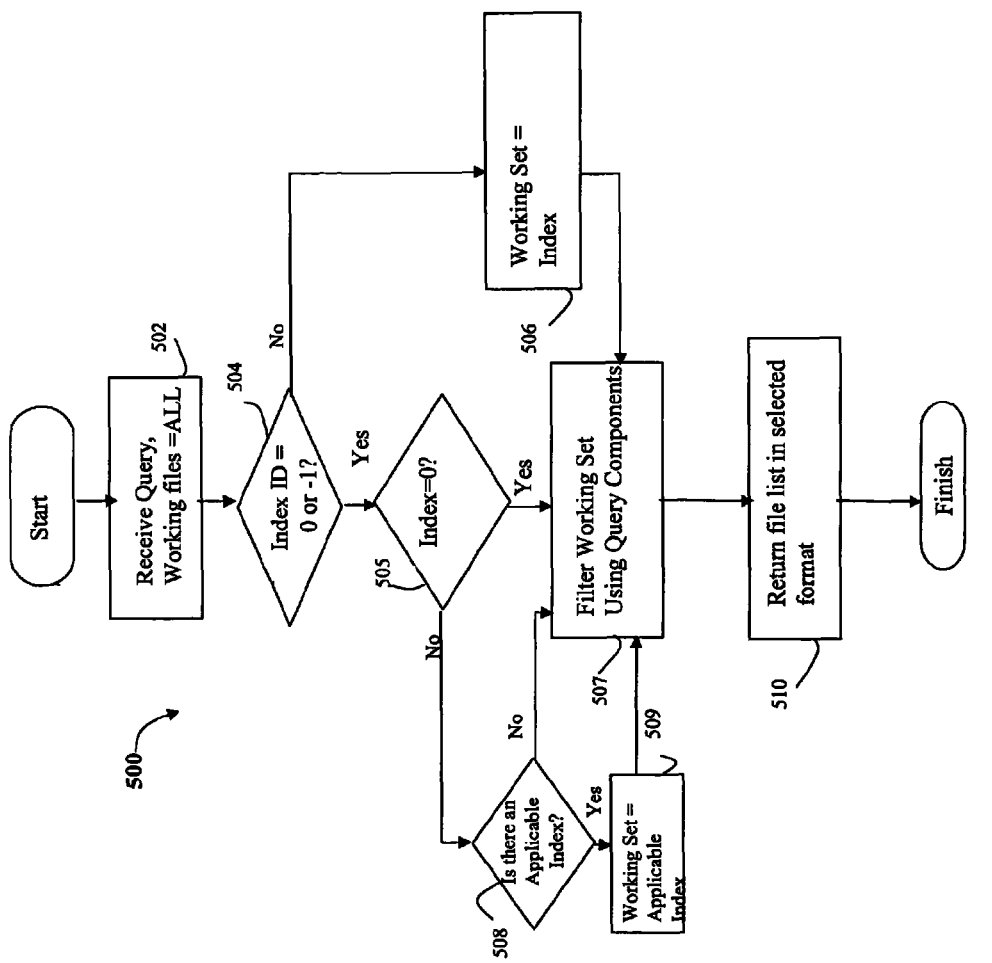
FIG. 12 is a flow diagram illustrating several exemplary steps that may be performed to respond to the File System Query of FIG. 11.

In one embodiment, matching files are returned to the requesting client over a File Mover API HTTP channel as part of an XML encoded response. FIG. 12 is a flow diagram illustrating exemplary steps that may be performed to handle a File System Query at a file server of the present invention. At step 502, when a query request arrives at the server, it is passed to the index manager, which processes the query against the existing indexes as follows. At step 502, the index manager assigns a Working Set of files to be all files. At step 504 the index manager checks the value provided in the index identifier. If an index identifier, other than 0 or −1, is provided then the index manager assigns the Working Set of files to be equal to the set of files contained in the indicated index at step 506, and proceeds to step 507. If 0 is provided as the index identifier, then the index manger proceeds immediately to step 507 without changing the Working Set of files. If −1 is provided as the index identifier, this indicates that any applicable index may be used, and the process of determining whether there is an applicable index for the query begins. At step 508 the index manager attempts to find an index that can be used to satisfy the query using any known method. For example, one method of determining whether an index can be used to satisfy the query is as follows: for each basic query in the query request, q1, q2, . . . , qn the index manager determines if an index exists for the attribute which is being queried by comparing the key attribute of the index, (stored, for example, in an index list 64, FIG. 4) to the first query component. If an index exists for qi, the index manager compares the index selector with the remaining basic queries in the query request (qi+1, . . . qn) to determine if the set of files in the index is a superset of the set of files defined by the remaining basic queries.

If there is an index which meets this condition, the identified index is said to be applicable to the query. Many processes may be used to determine whether an index is applicable to a query. For example, one process for determining whether the index is applicable to the query defines the index file selector to be the conjunction of a series of basic query components (s1, s2 . . . sm). The set of files defined by the selector is a superset of the set of files defined by the query (qi+1, qi+2, . . . , qn) if for each component si of the selector, there exists a component qj in (qi+1, . . . , qn), such that si and qj represent basic queries on the same file attribute AND the set of files defined by si is a superset of the set of files defined by qj. (e.g. si is the basic query component size>10 MB, and qj is the basic query component size>20 MB).

Other methods of determining that a query is a subset of another query (or existing index) will be obvious to those learned in the art of database management systems. Such other methods of determining whether there is an applicable index may be substituted herein without affecting the scope of the invention.

For example, assume an index has been generated based on file size with a file selector of (mod time<1/1/05, name equals "*.doc"). A File system query for files of (size>10 MB, mod time<6/6/04, name equals "*.doc", worm equals "commit") is received. The index is applicable to this query.

However, the index not applicable to a file system query for files of (size>20 MB, mod time<6/6/04), because the query does not contain a qj which represents a proper subset of "name equals '*.doc.'" Referring again to FIG. 12, if it is determined at step 508 that there is an applicable index for the query, the process proceeds to step 509 where the Working Set is set equal to the Applicable Index, and then to step 507 for query processing.

At step 507, the query components are used to filter the Working Set of files. Note that the Working Set may retain the initial value of "all files" if no indexes are applicable to the query, or if the index identifier is set to 0 in the File System Query, and a recursive scan of the file system will be necessary to generate the contents of the Working Set. The option to forgo use of the index may be useful in the asynchronous or point-in-time update model to ensure that the query operates on the latest on-disk state. The process of filtering the Working Set using the query components is sequentially performed using each of the query components to provide a reduced working set until all query components have been applied. The efficiency gains of using an index as the Working Set of files is realized in this stage whenever the query component concerns the key attribute of the index (e.g. the query component is file size >10 MB and index is ordered by file size), or when the number of files in the index is significantly smaller than the number of files in the entire file system.

Following the application of all query components to the Working Set, the Working Set now represents all of the files which possibly satisfy the query.

At step 510, before returning the list of matching files, if the File System Query has specified full path names as a response format, for each file the "parent inode" field is used with the ".." link in each directory to generate the full path name of the file before returning this string to the requestor. Otherwise simply return the file ID of each file.

Figure 13:
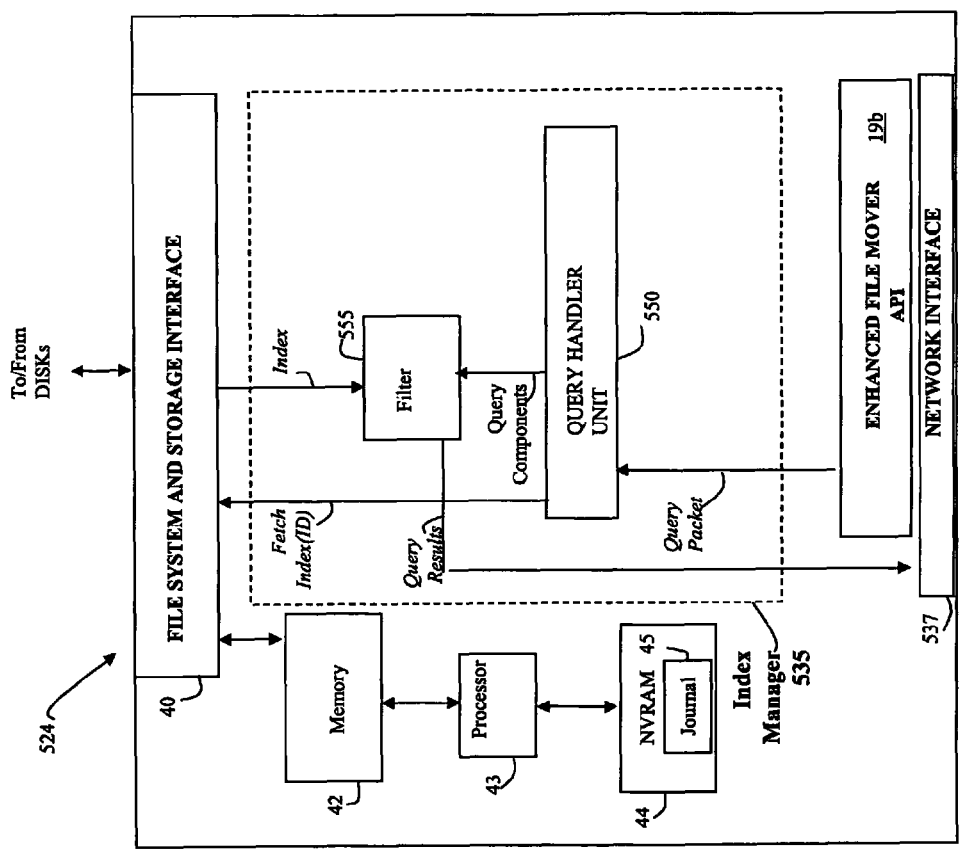
FIG. 13 is a diagram provided to illustrate components that may be included in a file server supporting the File System Query instruction.

Referring now to FIG. 13, an alternate embodiment of a file server 524 supporting only the File System Query component of the architecture is shown. In accordance the above description, a File System Query is forwarded to the Query Handler Unit 550, which parses the query into query components that are forwarded to the filter 555. The filter retrieves meta-data from the file system, applies the query components to the meta-data to provide filtered results, and forwards the query response to the requesting device via the Network Interface.

Accordingly an architecture has been shown and described which includes several components that improve the performance of policy enforcement in a hierarchical storage environment. A File System Query instruction and method of use permits a richer set of queries to be expressed by a policy engine, thereby permitting more complex policies to be implemented with ease. The File System result is generated at the file server, and only files of interest are forwarded to the policy engine. The file system query advantageously may be applied against a pre-generated index having one more characterizing attributes to further reduce the processing required to retrieve policy data, although this is not a requirement of the invention. An Index Build instruction, added to a programming interface, allows a policy engine to generate the characterizing indices in advance of use. Index maintenance techniques maintain consistency between the index and the file system to ensure that the policy can be enforced using accurate file information.

Many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method for maintaining an index to files in a file system, the index including identifiers of files having key attribute values of interest, the method including the step of:
passing an Index Build Command from a policy server to the file system;
constructing, within the said file system having said files, the index in response to receipt of the Index Build command received from the policy server, such policy server is configured to apply policy rules generated to control the placement of data and metadata on various storage systems, the index is associated with at least one policy of the policy server;
monitoring, in said file system, said files to detect changes in one or more key attribute values of interest; and
updating the index within the said file system in accordance with the key attribute value changes.

2. The method of claim 1, wherein the step of updating the index is synchronized with the change in key attribute value.

3. The method of claim 1, wherein the step of updating the index is performed asynchronously of the key attribute value change.

4. The method of claim 1, wherein the step of monitoring the file system files includes the steps of:
periodically storing file system snapshots; differentiating sequential file system snapshot pairs to identify changed key attribute values; and
updating the index in accordance with the changed key attribute values.

5. The method of claim 1, wherein the step of updating the index in accordance with the changed key attribute values includes the step of maintaining consistency between the index and the file system.

6. The method of claim 5, wherein the step of maintaining consistency includes the step of logging changes to the index in a journal.

7. The method of claim 6, wherein the step of updating the index is synchronized with the key attribute value change, and wherein the step of journaling index updates includes the steps of:
logging a file event in response to a file access by a client;
executing the file event;
determining whether the index is affected by the file event; and
updating the index in accordance with key attribute value changes resulting from the file event; and
following the updating of the index, returning a result of the file access to the client.

8. The method of claim 6, wherein the step of updating the index occurs asynchronously of the key attribute value change, and wherein the step of journaling index updates includes the steps of:
logging a file event in response to a file access by a client;
executing the file event;

returning a result of the file access to the client;
following the return of the result to the client, determining whether the index is affected by the file event; and
updating the index in accordance with key attribute value changes resulting from the file event.

9. An apparatus, comprising:
a file server;
a processor for maintaining an index to files in a file system of the file server, the index including identifiers of files having one or more key attribute values of interest, the processor:
passing means for passing an Index Build Command from a policy server to the file system;
generating means for generating the index within said file system having said files in response to the Index Build command received from a the policy server, such policy server is configured to apply policy rules generated to control the placement of data and metadata on various storage systems the Index Build command including the one or more key attribute values of interest;
file system monitoring means for monitoring in said file system events to detect key attribute value changes; and
index update means for updating the index in said file system in accordance with detected key attribute value changes.

10. The apparatus of claim 9, wherein index updates are synchronized to associated key attribute value changes.

11. The apparatus of claim 9, wherein index updates operate asynchronously of associated key attribute value changes.

12. The apparatus of claim 9, wherein the file system monitoring means further comprises:
storage for storing periodic file system snapshots;
means for generating a delta-set for use by the update means, the delta set identifying files having changed key attribute value changes in a sequential file system snapshot pair.

13. The apparatus of claim 9, wherein the updating means includes consistency logic for maintaining consistency between the index and the file system.

14. The apparatus of claim 9, wherein the consistency logic includes:
a journal for logging intended changes to an index prior to changing the index.

15. The method recited in claim 1 wherein one of the key attributes is an access frequency attribute that tracks the number of accesses to a file within a certain time delta.

16. The method recited in claim 1 wherein one of the key attributes is an index access frequency array attribute which tracks the number of accesses to a file within a certain time delta to previous X time deltas.

* * * * *